Dec. 9, 1952 L. C. MILLER 2,620,965
PORTABLE PNEUMATIC POWER UNIT
Filed June 7, 1947 3 Sheets-Sheet 2

Leonidas L. Miller,
Inventor

Lyon & Lyon
Attorneys

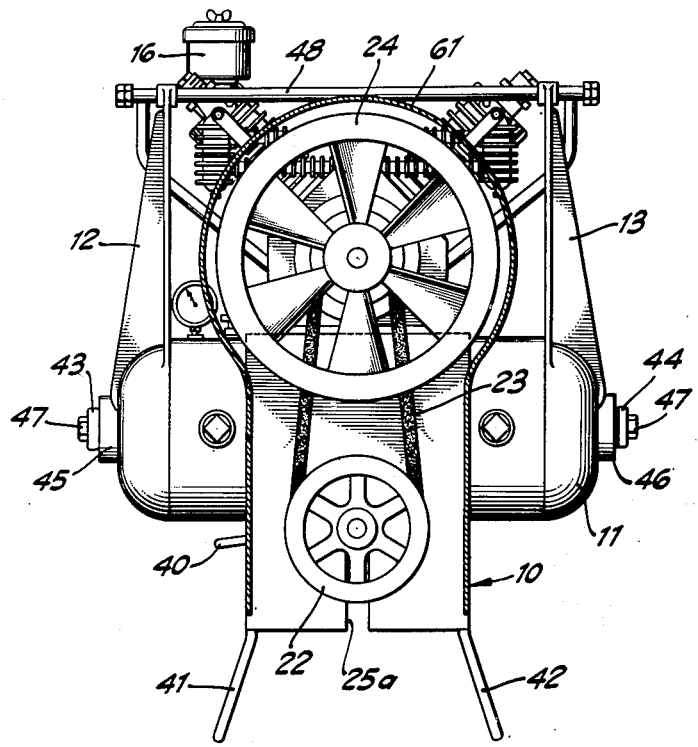
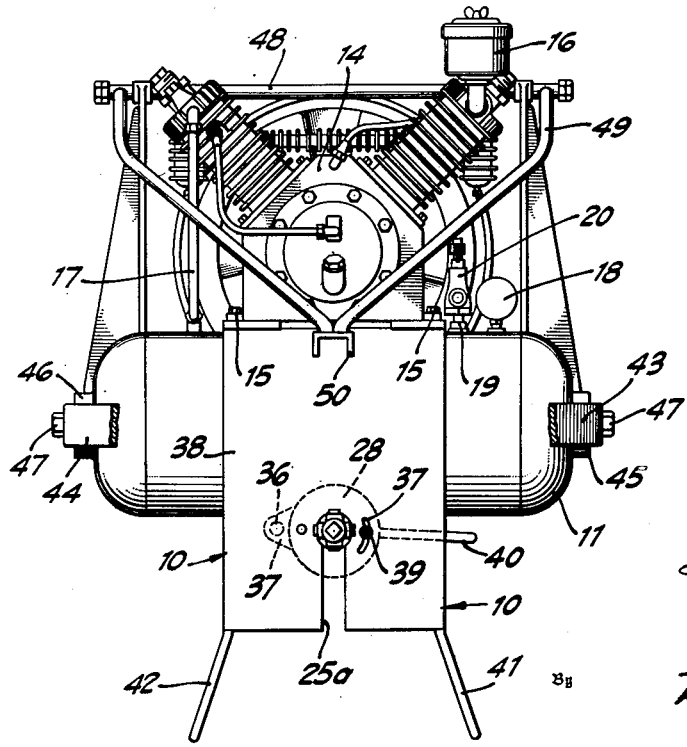

Patented Dec. 9, 1952

2,620,965

UNITED STATES PATENT OFFICE 2,620,965

PORTABLE PNEUMATIC POWER UNIT

Leonidas C. Miller, Los Angeles, Calif.

Application June 7, 1947, Serial No. 753,395

6 Claims. (Cl. 230—38)

1

This invention relates to a portable pneumatic power unit and is particularly directed to a unitary assembly which may be mounted on a tractor or trailer and driven from a power take-off provided on the tractor.

Certain agricultural tools are best operated by compressed air, but no fully satisfactory pneumatic power unit has been developed for operating such tools. Such a unit must have relatively high capacity and should be adapted for removable mounting on a tractor or a trailer towed by the tractor. Such a power unit should be entirely self-contained with the exception of the power drive so that it can be installed and removed in a minimum of time and without extensive alterations to the vehicle which supports it. Such a pneumatic power unit finds particular usefulness in providing a source of compressed air for use in operating pneumatic driven clippers, saws, pruning tools, etc., for use in orchards, vineyards, etc.

Accordingly, it is the principal object of my invention to provide a pneumatic power unit, demountably positioned on a tractor and driven from the power take-off or mounted on a trailer and driven from the power take-off of the tractor.

Another object is to provide a compact unitary assembly with a storage reservoir or tank positioned between a drive shaft and a compressor driven thereby.

Another object is to provide such a device in which the drive shaft is laterally adjustable with respect to the compressor drive element in order to maintain proper tension in the drive chain or drive belt.

Another object is to provide such a unitary assembly which can be installed in a minimum of time.

Another object is to provide such a pneumatic power unit which is particularly adapted for connection with a tractor having rearwardly extending lifting arms, such device being provided with supporting feet for maintaining the device in an upright position when disconnected from operative position on the tractor or trailer.

Other objects and advantages will appear hereinafter.

In the drawings:

Figure 3 is a rear elevation, partly in section.

2

Figure 4 is a front elevation, partly in section.

Figure 5:
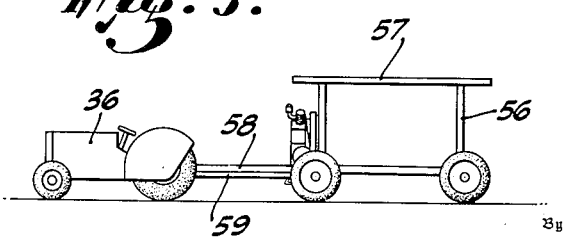

Figure 5 is a diagrammatic elevation illustrating the portable pneumatic power unit in position on a trailer and driven from the power take-off of the tractor.

Referring to the drawings, a frame generally designated 10 includes a tank 11 which forms a reservoir for compressed air. The tank 11 is provided with upwardly extending posts 12 and 13 positioned at opposite ends thereof. A horizontal plate 13 fixed to the frame 10 by any convenient means such as by welding, forms a support for a rotary air compressor 14 which may be of any conventional design. Threaded elements 15 are provided for securing the compressor 14 to the plate 13. The compressor may be provided with the usual air filter 16 through which atmospheric air is drawn for compression and subsequent delivery into the tank 11 by way of the inlet pipe 17. A gage 18 may be provided to indicate the pressure in the tank. The tank outlet 19 is provided with a control valve 20 and the latter may be connected by way of a hose, not shown, to operate any desired pneumatic driven tool. Such tool may be of the type shown in my copending application for Pneumatic Actuator, filed May 4, 1946, Serial No. 667,320, but this use is by way of illustration only, and it is obvious that any other suitable tool likewise may be powered by this unit. Compressor 14 is mounted above the tank 11 between the upwardly extending posts 12 and 13 and the rotary drive shaft of the compressor, not shown, carries a driven pulley 21 at its extending end. A driving pulley 22 which may be of larger diameter than the driven pulley 21 is aligned therewith and adapted to drive the pulley 21 by means of V-belts 23. A fan 24 is secured to the driven pulley 21 and adapted to cause a current of air to flow over the exposed exterior surface of the compressor 14. A guard 61 may be provided to enclose the drive pulleys and belt 23 and also to enclose the fan 24. This guard 61 is preferably equipped with a wire mesh screen 62 on its back surface to permit the required draft of air to flow therethrough. The drive pulley 22 is mounted on the overhanging rearward end of the drive shaft 25 which extends under the tank 11. Axially spaced bearings 26 are mounted in a tube 27 provided with flanges 28. The bearings 26 rotatably support the shaft 25. The forward end of the shaft 25 carries the universal joints 29 and 30 and a forwardly extending fitting 31 is provided with an axial extending splined recess 32 adapted to receive the drive spline 33 of the power take-off unit 34. The power take-off unit 34 is of any conventional design and may be mounted on the differential gear case 35 of the tractor, generally designated 36.

Means are provided for shifting the drive shaft 25 laterally with respect to the compressor 14 in order to maintain proper tension in the belts 23. As shown in Figure 4 of the drawings, this means includes pivot pins 36 which pass through laterally extending ears 37 on the flanges 28 and connect the flanges to the frame 10. An arcuate slot 37, formed in the front plate 38 of the frame 10, receives the shank of a cap screw 39 which is threaded into the forward flange 28. The cap screw 39 may be tightened to maintain the drive shaft 25 in selected position. Release of the cap screw 39 enables the position of the shaft 25 to be shifted by utilizing the laterally extending shifter handle 40 provided on the forward flange 28. Slots 25a are provided in the frame 10 to permit this movement of the shaft 25. From this description, it will be understood that rotation of the spline element 33 serves to turn the universal joints 30 and 29 and cause the drive shaft 25 to drive the compressor 14 through the pulleys 21 and 22 and belt 23. The adjustment provided by the pins 36, slot 37 and cap screw 39 enables the proper tension to be maintained in the belt 23.

Downwardly extending foot elements 41 and 42 are provided on the frame 10 for supporting the pneumatic power unit on the ground or other level surface when not in use. When it is desired to support the unit on the tractor 36, the tractor is backed into position so that the fitting 31 may be engaged with the spline element 33 of the power take-off unit 34. The rearwardly extending movable lifting arms 43 and 44 are pivotally connected to bosses 45 and 46 by means of the bolts 47. The bosses 46 and 45 are provided on opposite ends of the tank 11. A tie bar 48 which extends transversely between the upper ends of the posts 12 and 13 carries on its outer ends a yoke or link 49 provided with a clevis 50 mounted on the forwardly extending end of the link 49. A removable pin element 51 is provided for connecting the clevis 50 to a stationary fin 52 provided on the differential housing 35 of the tractor 36.

When the lifting arms 43 and 44 have been connected to the tank 11 by means of the bolts 47, and after the pin 51 has been inserted to connect the clevis 50 to the tractor 34, the lifting arms are raised by means of mechanism, not shown, provided on the tractor 36. Such mechanism for lifting the arms 43 and 44 may be of any convenient or desirable type, and, for example, may be similar to that illustrated in Patent No. Re. 22,642 issued May 15, 1945. Lifting movement of the arms 43 and 44 raises the pneumatic power unit and lifts the foot elements 41 and 42 off the ground. In practice, it is found convenient to insert a strut 53 between a part of the lifting mechanism 54 provided on the tractor 36 and a stationary axle housing 55. The use of the strut 53 takes the load off the hydraulic mechanism, not shown, ordinarily employed for lifting the arms 43 and 44 so that such hydraulic mechanism may be relieved of carrying the weight of the pneumatic power unit supported on the lifting arms 43 and 44.

Figure 1:
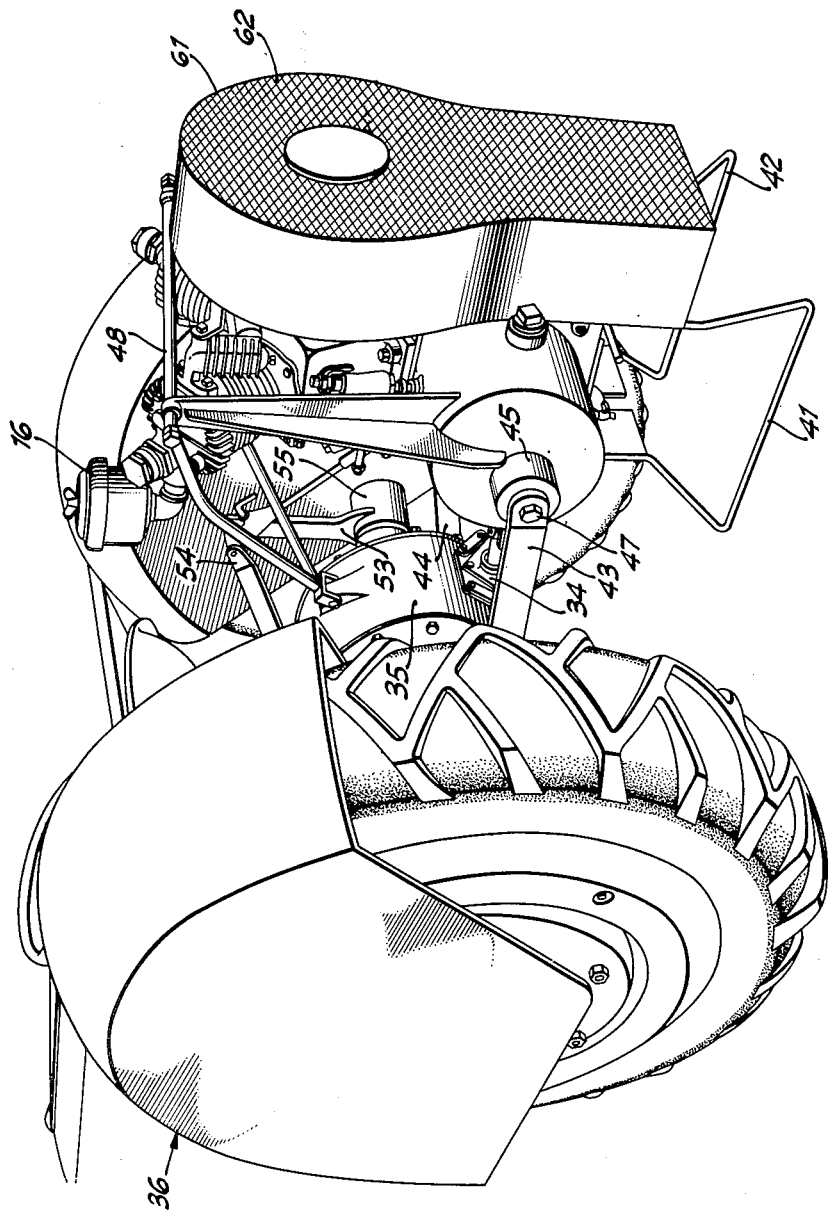
Figure 1 is a perspective view showing a preferred embodiment of my invention mounted in position on the rear portion of a tractor.
Figure 2:
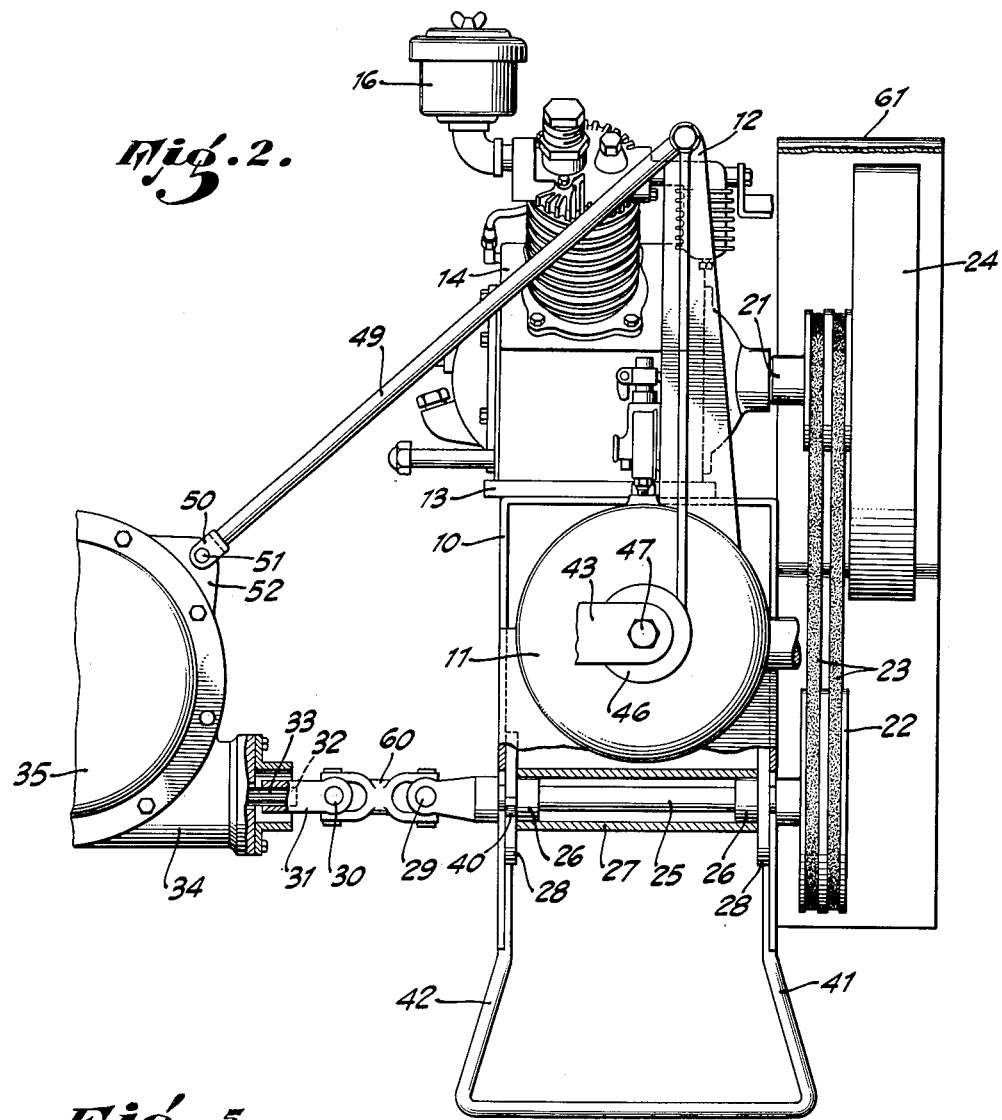
Figure 2 is a side elevation thereof, partly broken away and illustrating details of construction.

As shown in Figure 5, it is contemplated that the pneumatic power unit embodying my invention may be mounted on a trailer 56 which is towed behind the tractor 36. In pruning certain types of orchard trees it has been found that a trailer having an elevated platform 57 is desirable in order that the workers may stand on the platform while using pneumatic operated tools in pruning or performing other work on the trees. The pneumatic power unit may be secured to the forward end of the trailer 56 by any convenient means and is adapted to be driven through a torque tube 58 from the power take-off unit 34 of the tractor 36. This torque tube 58 may be positioned directly above the tongue 59 by which the trailer is towed behind the tractor and this torque tube simply is an extension of the fitting 60, shown clearly in Figure 2 of the drawings. If desired, a guard of any convenient type may be installed over the torque tube to exclude foreign matter and to prevent injury to workers. As the tractor moves through the orchard towing the trailer 56, the torque tube 58 serves to supply power to the pneumatic power unit. When the tractor turns, the torque tube remains parallel to the tongue 59, the universal joints 30 and 29 serving to permit the tongue 59 and torque tube 58 to assume the required angle during the turning operations.

Having fully described my invention, it is to be understood that I do not wish to be limited to the details herein set forth, but my invention is of the full scope of the appended claims.

I claim:

1. In a pneumatic power unit attachment for a tractor having movable lifting arms and a power take-off element, the improvement comprising: a portable pneumatic power unit having a frame including a tank, means for removably supporting the tank on the tractor lifting arms, a compressor mounted on the frame and adapted to deliver air under pressure into the tank, means for driving the compressor including a drive shaft, a driving member on the drive shaft, a driven member on the compressor, an endless flexible element connecting said members whereby the driving member may drive the driven member, bearing means for rotatably supporting the drive shaft, adjustable means for supporting said bearing means on the frame for transverse movement relative to said shaft whereby tension in the flexible element may be regulated, means including a universal joint whereby the drive shaft may be driven from the said power take-off element of the tractor, a pair of upright posts on the frame spaced laterally thereof, and a yoke having diverging ends pivotally connected to the upper ends of the posts, the yoke having a forward end adapted for pivotal connection to a stationary element on the tractor.

2. In a pneumatic power unit attachment for a tractor having a power take-off element and a power operated lift, the improvement comprising: a portable pneumatic power unit having a tank, means for removably supporting the tank on the said power operated lift of the tractor, a compressor mounted on the tank and adapted to deliver air under pressure into the tank, means for driving the compressor including a drive shaft, a driving pulley on the drive shaft, a driven pulley on the compressor, a belt connecting said pulleys whereby the driving pulley may drive the driven pulley, bearing means for rotatably supporting the drive shaft, adjustable means for supporting said bearing means for transverse movement relative to said tank whereby tension in the belt may be regulated, drive means including a universal joint whereby the drive shaft may be driven from the said power take-off element of the tractor, and foot elements depending from the tank for supporting the power unit on the ground at an elevation permitting connection and disconnection of the drive means and power take-off element.

3. A pneumatic power unit attachment for a tractor having a power take-off element and a power operated lift, comprising in combination: a frame including a tank, releasable means to support the frame on the power operated lift of said tractor, a compressor mounted on the frame above the tank adapted to deliver compressed air into the tank and provided with driven member, means to rotate the driven member including a drive shaft extending under the tank, a drive member on one end of the shaft, an endless flexible element connecting the said members whereby the drive member may drive the driven member, bearings on the frame for rotatably supporting the drive shaft, means including a universal joint at the other end of the shaft whereby the drive shaft may be driven from the power take-off element of the tractor, a pair of upright posts on the frame spaced laterally thereof, and a yoke having diverging ends pivotally connected to the upper ends of the posts, the yoke having a forward end adapted for pivotal connection to a stationary element on the tractor.

4. In a pneumatic power unit attachment for a tractor having a power elevated draft linkage trailingly pivoted on its rear end portion and also provided with a power take-off element, the combination of: a frame including a tank, releasable means to support the frame on the draft linkage, a compressor mounted on the frame above the tank adapted to deliver compressed air into the tank and provided with a driven member, means to rotate the driven member including a drive shaft extending under the tank, a drive member on the shaft, an endless flexible element connecting the said members whereby the drive member may drive the driven member, bearings on the frame for rotatably supporting the drive shaft; means including a universal joint at one end of the shaft whereby it may be driven from the power take-off element and foot elements depending from the tank for supporting the power unit attachment on the ground at an elevation permitting connection and disconnection of said means and power take-off element.

5. In a pneumatic power unit attachment for a tractor having a pair of power elevated draft links trailingly pivoted on its rear end portion and also provided with a power take-off element, the combination of: a frame including a horizontal cylindrical tank, laterally spaced means on the frame to support it on the extending ends of the draft links, a compressor mounted on the frame above the tank adapted to deliver compressed air into the tank and provided with a driven member, means to rotate the driven member including a drive shaft extending under the tank, a drive member on the shaft, an endless flexible element connecting the said members whereby the drive member may drive the driven member, bearings on the frame for rotatably supporting a drive shaft, means supporting a universal joint at one end of the shaft whereby it may be driven from the power take-off element of the tractor, a pair of upright posts on the frame spaced laterally thereof, and a yoke having diverging ends pivotally connected to the upper ends of the posts, the yoke having a forward end adapted for pivotal connection to a stationary element on the tractor.

6. In a pneumatic power unit attachment for a tractor having a pair of power elevated draft links trailingly pivoted on its rear end portion and also provided with a power take-off element, the combination of: a frame, releasable pivotal means for supporting the frame on the extending ends of the draft links, a compressor mounted on the frame and adapted to deliver compressed air and provided with a driven member, means to rotate the driven member including a drive shaft, a drive member on the rear end of the shaft, an endless flexible element connecting the said members whereby the drive member may drive the driven member, bearings for rotatably supporting the drive shaft, a pair of upright posts on the frame spaced laterally thereof, a yoke having diverging ends pivotally connected to the upper ends of the posts, the yoke having a forward end adapted for pivotal connection to a stationary element on the tractor, means including a universal joint at the forward end of the shaft whereby the shaft may be driven from the power take-off element, said means including a part engageable with the power take-off element through relative axial movement, and foot elements depending from the frame for supporting the power unit attachment on the ground at an elevation permitting connection and disconnection of said means and power take-off element and of said forward end of the yoke.

LEONIDAS C. MILLER.

REFERENCES CITED

The following references are of record in the file of this patent:

UNITED STATES PATENTS

| Number | Name | Date |
| --- | --- | --- |
| Re. 22,912 | Gaertner | Sept. 9, 1947 |
| 1,159,829 | Cashen | Nov. 9, 1915 |
| 1,582,028 | Dunn | Apr. 27, 1926 |
| 1,742,948 | Carlson | Jan. 7, 1930 |
| 1,794,485 | Scott | Mar. 3, 1931 |
| 1,884,928 | Lalli | Oct. 26, 1932 |
| 1,904,832 | Knapp | Apr. 18, 1933 |
| 1,940,940 | Davey | Dec. 26, 1933 |
| 2,350,880 | Dellinger | June 6, 1944 |
| 2,490,698 | McClenny | Dec. 6, 1949 |